2,701,438

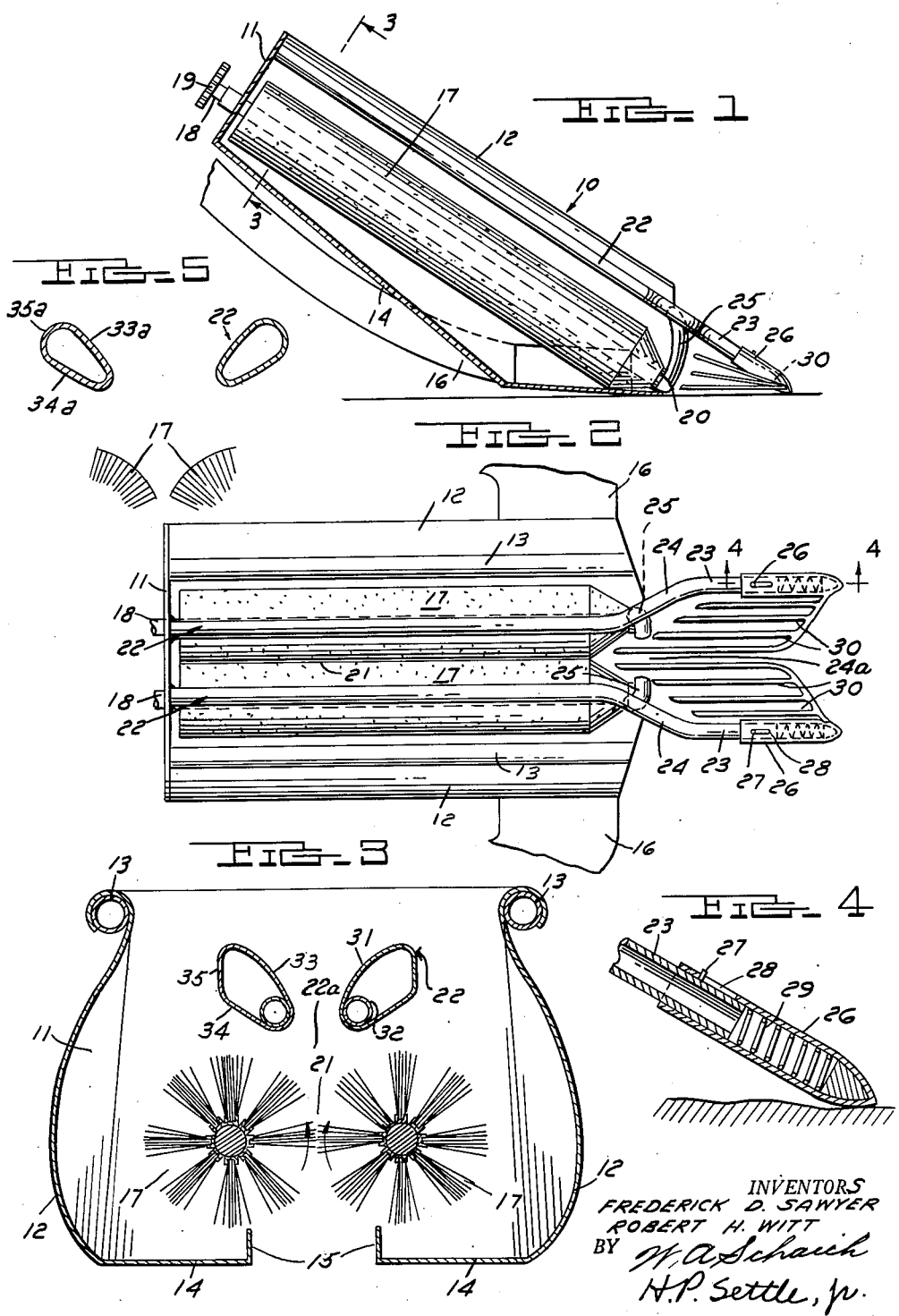
Feb. 8, 1955     F. D. SAWYER ET AL     2,701,438
PLANT GUIDING MEANS FOR HARVESTING MACHINES
Filed Feb. 11, 1952
INVENTORS
FREDERICK D. SAWYER
ROBERT H. WITT
ATTORNEYS though the plants are displaced laterally
United States Patent Office 2,701,438
Patented Feb. 8, 1955

PLANT GUIDING MEANS FOR HARVESTING MACHINES

Frederick D. Sawyer, Birmingham, and Robert H. Witt, Royal Oak, Mich., assignors, by mesne assignments, to Ford Motor Company, Dearborn, Mich., a corporation of Delaware Application February 11, 1952, Serial No. 270,993

2 Claims. (Cl. 56—33)

The present invention relates to a plant guiding means for a harvesting machine and more particularly to a plant guiding means for use with a crop stripping element for a harvesting machine.

The plant guide means of the present invention is particularly adapted for use with a brush-type crop stripping device such as the cotton harvester disclosed in the pending application of Robert H. Witt, Serial Number 240,566, filed August 6, 1951, now U. S. Patent 2,644,686, dated January 5, 1954.

The guiding means of the present invention cooperates with the harvester stripping elements to insure the effective stripping of the crop from its associated plant with minimum removal of leaves, branches and other undesirable portions of the plant. More specifically, the guide means of the present invention comprises a pair of laterally spaced, elongated rod-like elements or "compressors" juxtapositioned over the stripping elements, so that the portions of the plant to be stripped by the stripping elements must first pass between the guiding elements. In this manner, the plant is more or less folded upon itself prior to stripping, and the plants are reduced in circumference to lessen the possibility of the plant branches wrapping about the stripping elements to clog the same. Further, the distance between the pair of compressors is preferably less than the distance between the rotational axis of the associated stripping elements, so that the compressors serve to center the plants between the stripping elements even though the plants are displaced laterally from the true row center.

In addition, the plant compressors of the present invention make possible the elimination of the hood or cover formerly necessary to enclose the brushes so that greater visibility of the stripping elements and greater accessibility to the same is possible. This last advantage is possible since the compressors are so positioned (with relation to the stripping elements and the flare sheets for the stripping elements) that it is impossible for portions of the harvested crop centrifugally flung from the brushes to escape between the compressors and the flare sheets.

In a preferred embodiment of the present invention, the forward ends of the compressors carry plant lifters effective to elevate the lowermost branches of the plants and to position these plants for effective stripping action at the stripping elements. If desired, the plant lifters carried by the compressors may be spring biased toward the ground to insure accurate following of the ground contour.

It is, therefore, an important object of the present invention to provide a plant guiding means for a stripper-type harvesting machine.

Another important object is the provision of a pair of compressor elements overlying the stripping elements of a harvesting machine and effective to compress plants prior to the stripping of the crop therefrom and to center the plants between the stripping elements for effective stripping action.

It is a further object to provide a plant compressor for a harvesting machine having laterally juxtapositioned counterrotatable stripping elements, the compressors closely overlying the stripping elements and extending longitudinally thereof to define a restricted throat through which plants to be stripped must pass prior to subjection of the plants to the stripping action of the elements, the compressors also being effective to confine the stripped crop as the same is centrifugally flung from the stripping elements.

Still another important object is the provision of an improved harvesting head for a cotton harvesting machine including a pair of laterally spaced stripping brushes defining a restricted stripping nip therebetween, and a pair of plant compressors overlying the brushes to extend along the length thereof and projecting forwardly therebeyond to provide plant lifting means for positioning the plants for subsequent entry into the crop stripping nip.

The specific nature of this invention, as well as other objects and advantages thereof, will become apparent to those skilled in the art from the following detailed description, taken in conjunction with the one sheet of drawings on which, by way of preferred example only, is illustrated two embodiments of this invention.

On the drawings:

Figure 1 is a side elevational view, with parts broken away and in section, of a harvesting head for a crop stripping machine embodying the present invention;

Figure 2 is a fragmentary plan view of the harvesting head of Figure 1;

Figure 3 is an enlarged sectional view taken along the plane 3—3 of Figure 1;

Figure 4 is an enlarged sectional view, with parts shown in elevation, taken along the plane 4—4 of Figure 2; and Figure 5 is a fragmentary sectional view similar to Figure 3 illustrating a modified form of plant guiding means of the present invention.

As shown on the drawings:

In Figure 1 reference numeral 10 refers generally to a harvesting head for a stripper-type harvesting machine of the type disclosed in the said U. S. Patent 2,644,686 of Robert H. Witt.

The harvesting head 10 generally comprises a rear wall 11 suitably mounted upon a carrying frame and joined to laterally spaced forwardly extending sheet metal flare sheets 12 welded or otherwise secured to forwardly extending reinforcing elements 13 adjacent the upper sides thereof. The flare sheets 12 enclose therebetween a space through which passes a plant from which a crop is to be stripped. The flare sheets 12 are thus provided with generally horizontally extending floor walls 14 which are upwardly and rearwardly inclined (Figures 1 and 3) and which terminate in upturned lips 15 defining a slot therebetween through which the stripped crop passes. At the forward end of the flare sheets, the space enclosed thereby is in communication with a rearwardly extending pickup conduit 16 which is subjected to suction, as by venting the conduits to the intake side of a conveyor fan. These portions of the harvesting machine are more fully described in the above identified Witt application.

Positioned within the space substantially enclosed by the flare sheets 12 are a pair of upwardly and rearwardly inclined stripping elements 17 which preferably take the form of bristle brushes mounted upon parallel spindles 18 projecting rearwardly through the rear wall 11 and carrying suitable drive means, such as sprockets 19, adapted to be driven by suitable means. The spindles 18 are journaled at their forward ends by plates 20 carried by the flare sheets at the forward ends thereof. The brushes 17 are counterrotatable (as indicated in Figure 3) and cooperatively define a restricted stripping nip 21 therebetween. It will be appreciated that plants passing through the nip 21 will be subjected to the stripping action of the brushes and that the crop, such as cotton, on the plant will be stripped therefrom by the brushes.

Mounted above each of the brushes and projecting forwardly from the rear plate 11 in a direction substantially parallel to the associated spindle 18 is a plant compressor indicated generally at 22. The pair of plant compressors 22 are laterally spaced through a distance less than the distance between the brush spindles 18 and are positioned directly over the associated brushes at a height less than the height of the associated flare sheets 12. Those portions of the compressors 22 overlying the forward ends of the brushes are deformed laterally outwardly, as at 24, so that in advance of the brushes the forward compressor portions 23 are spaced through a distance greater than the distance between the brush spindles to define an enlarged plant entry passage. Thus, the intermediate laterally outwardly extending portions 24 of the compressors define a rearwardly and inwardly tapered compressor throat 24a through which plants are guided to the brush nip 21.

The forward ends of the compressors are supported by a pair of upstanding posts 25 joining the plates 20 to the intermediate portions 24 of the compressors. The extreme forward ends of the compressors telescopically receive thereover plant lifter sleeves 26 which are retained on the compressors by means of an upstanding pin 27 on each compressor riding within a slot 28 formed in the sleeve. A resilient compressor spring 29 is confined between the extreme forward end of each of the compressors and the interior of the associated sleeve, so that the sleeve is resiliently urged downwardly, with upward movement of the sleeve so as to telescope the same over the compressor being accommodated by movement of the pin 27 within the slot 28.

Each of the sleeves 26 carries a plurality of laterally inwardly extending plant lifter fingers 30 fixed to the sleeve for longitudinal and vertical movement therewith, the individual fingers 30 being vertically offset to lift the lower branches of a plant interposed between the sleeves in order to properly present the plant to the stripping nip 21.

The cross sectional configuration of the compressors will best be appreciated from Figures 3 and 5. The compressors in Figure 3 are provided by a sheet metal cover 31 lapped about and rigidly joined to a central tubing section 32 to define a cross sectional shape having an upper surface 33 of relatively great radius of curvature, a lower surface 34 which is substantially flat and which projects outwardly from the tubing 32 toward the upper extremity of the associated flare sheet 12, and a substantially vertical joining surface 35. The reason for the specific cross sectional configuration of the compressors will be understood from the fact that, as the machine advances along the row of plants, the plants are drawn downwardly between the compressors and the relatively large radius of the upper surface 33 causes a gentle inward folding or compression of the plant branches. Thus, the compressors cooperably define compression nip 22a. The undersurface 34 of the compressors will be contacted by portions of the stripped crop which are flung centrifugally from the brushes 17 and the surface 34 is so positioned that it will be impossible for cotton tending to be flung through the open top of the flare sheets to by-pass the compressors and thus to escape from the flare sheets. The vertical surface 35 will be contacted by any cotton deflected from the flare sheets intending to be thrown centrally therefrom.

In Figure 5, the modified compressors are of a generally teardrop shape having flat upper and lower surfaces 33a and 34a respectively joined by a curved rear face 35a. The surfaces 33a and 34a serve the purposes set forth in conjunction with the description of the surfaces 33 and 34. It will also be noted that the compressors of Figure 5 are self-sustaining and are not reinforced by a tubing or pipe section.

From the foregoing description, it will be appreciated that the present invention provides an improved plant guiding means particularly adapted for use with counter-rotating stripping elements. The upward and rearward inclination of the brushes, together with the forward motion of the harvesting head, causes the plants to be moved relative to the brushes. More specifically, the plants travel downwardly and rearwardly relative to the brushes so that the plants travel through the space between the compressors and then to and through the stripping nip.

The compressors are thus positioned in advance of the stripping nip to effectively condition the plants for subsequent stripping. The plant guiding means or compressors serve a plurality of functions including the supporting of resiliently mounted plant lifters, the provision of a convergent throat for guiding the plants to the brush stripping nip, the folding of the plant branches to prevent wrapping of the branches upon the stalks and to condition the plant for the ready stripping of a crop therefrom, and the confining of the stripped crop to the flare sheet area immediately surrounding the stripping elements. In addition to these functions of the compressors, it is possible to eliminate the heretofore necessary, expensive and heavy cover previously provided to overlie the brushes, thus reducing the cost of the harvesting head and improving the visibility and accessibility of the stripping elements.

It will, of course, be understood that various details of construction may be varied through a wide range without departing from the principles of this invention and it is, therefore, not the purpose tot limit the patent granted hereon otherwise than necessitated by the scope of the appended claims.

I claim:

1. In a harvesting machine, a pair of laterally spaced stripping elements counterrotatable to define an inclined stripping nip therebetween, and a pair of elongated rod-like plant compressors generally overlying said stripping elements and substantially parallel to said elements, said compressors cooperatively defining a compressing nip therebetween at which plants are compressed prior to being subjected to said stripping nip, said compressors having terminal portions projecting forwardly beyond said stripping elements, a tubular ground-engaging member telescopically mounted on each of said terminal portions for longitudinal movement, spring means contained within each of said tubular members and interposed between a closed end of a member and the terminal portion of a compressor, said spring means urging said members toward engagement with the ground, and plant lifting fingers on said members for elevating and guiding plants to said nips.

2. In a harvesting machine, a pair of laterally spaced stripping elements counterrotatable to define an inclined stripping nip therebetween, and a pair of elongated rod-like plant compressors generally overlying said stripping elements and substantially parallel to said elements, said compressors cooperatively defining a compressing nip therebetween at which plants are compressed prior to being subjected to said stripping nip, said compressors having laterally divergent terminal portions projecting longitudinally beyond said stripping elements to define an enlarged entry passage aligned with said nips, and plant lifting fingers carried by said terminal portions and projecting inwardly therefrom to lie therebetween for elevating and guiding plants through said entry passage to said compressing and stripping nips.

References Cited in the file of this patent

UNITED STATES PATENTS

| Number | Name | Date |
|---|---|---|
| 1,301,006 | Prior | Apr. 15, 1919 |
| 1,731,717 | Friend | Oct. 15, 1929 |
| 1,886,151 | Benjamin | Nov. 1, 1932 |
| 2,406,058 | Boone | Aug. 20, 1946 |
| 2,451,130 | Townsend | Oct. 12, 1948 |
| 2,491,777 | Smith | Dec. 20, 1949 |